(12) United States Patent
Kuepper et al.

(10) Patent No.: US 11,912,334 B2
(45) Date of Patent: Feb. 27, 2024

(54) DRIVING STATE-DEPENDENT RELEASE OF THE TILT FUNCTION OF A STEERING ELEMENT OF A VEHICLE

(71) Applicant: Ford Global Technologies, LLC, Dearborn, MI (US)

(72) Inventors: Philipp Kuepper, Grevenbroich (DE); Martin Faßbender, Buschhoven (DE); Bruno Alves, Huerth (DE); Klemens Degle, Cologne (DE); Lukas Loehmann, Siegburg (DE)

(73) Assignee: Ford Global Technologies, LLC, Dearborn, MI (US)

(*) Notice: Subject to any disclaimer, the term of this patent is extended or adjusted under 35 U.S.C. 154(b) by 163 days.

(21) Appl. No.: 17/533,203

(22) Filed: Nov. 23, 2021

(65) Prior Publication Data

US 2022/0169300 A1  Jun. 2, 2022

(30) Foreign Application Priority Data

Nov. 27, 2020 (DE) .......................... 102020214941.0

(51) Int. Cl.
| | |
|---|---|
| *B62D 1/187* | (2006.01) |
| *B60W 60/00* | (2020.01) |
| *B60W 50/14* | (2020.01) |

(52) U.S. Cl.
CPC ............. *B62D 1/187* (2013.01); *B60W 50/14* (2013.01); *B60W 60/001* (2020.02);
(Continued)

(58) Field of Classification Search
CPC ..... B62D 1/187; B60W 50/14; B60W 60/001; B60W 2510/06; B60W 2510/1005; B60W 2520/00
See application file for complete search history.

(56) References Cited

U.S. PATENT DOCUMENTS

| | | | | |
|---|---|---|---|---|
| 3,693,997 A | * | 9/1972 | Dreyer ................. | B62D 1/184 280/775 |
| 6,293,573 B1 | * | 9/2001 | Olde-Heuvel ..... | A63B 21/4045 280/124.179 |

(Continued)

FOREIGN PATENT DOCUMENTS

| | | |
|---|---|---|
| DE | 1916652 U | 5/1965 |
| DE | 69708735 T2 | 7/2002 |

(Continued)

*Primary Examiner* — Hunter B Lonsberry
*Assistant Examiner* — Harrison Heflin
(74) *Attorney, Agent, or Firm* — Vichit Chea; Price Heneveld LLP

(57) ABSTRACT

A method for releasing a tilt mechanism for a steering element of a vehicle, wherein the steering element is mounted pivotably around a tilt axis between a steering position and at least one non-steering position, wherein the steering element has at least one releasable locking arrangement, which fixes the steering element in the steering position and the at least one non-steering position. The locking arrangement can adopt at least one locking state in which the release of the locking arrangement is prevented and can adopt at least one release state in which the release of the locking arrangement is enabled. A corresponding steering arrangement and a corresponding vehicle are provided.

19 Claims, 1 Drawing Sheet

(52) U.S. Cl.
CPC . *B60W 2510/06* (2013.01); *B60W 2510/1005* (2013.01); *B60W 2520/00* (2013.01)

(56) References Cited

U.S. PATENT DOCUMENTS

| | | | | |
|---|---|---|---|---|
| 9,630,644 | B2* | 4/2017 | Soderlind | B62D 1/197 |
| 10,562,558 | B1 | 2/2020 | Spahn et al. | |
| 2013/0139637 | A1* | 6/2013 | Krauter | B62D 1/195 |
| | | | | 74/493 |
| 2015/0283989 | A1* | 10/2015 | Liang | B60W 10/06 |
| | | | | 477/5 |
| 2017/0297606 | A1* | 10/2017 | Kim | B62D 1/185 |
| 2017/0334452 | A1* | 11/2017 | Abe | B60W 10/04 |
| 2018/0037248 | A1* | 2/2018 | Schwarz | B62D 1/286 |
| 2018/0154932 | A1* | 6/2018 | Rakouth | B62D 1/286 |
| 2018/0196428 | A1* | 7/2018 | Pilutti | B60W 30/18 |
| 2019/0071113 | A1* | 3/2019 | Board | B62D 1/14 |
| 2019/0248263 | A1* | 8/2019 | Nagatomi | B62D 25/06 |
| 2020/0101998 | A1* | 4/2020 | Nishimura | G06T 7/70 |
| 2020/0307672 | A1* | 10/2020 | Scholand | B62D 1/185 |
| 2020/0339176 | A1* | 10/2020 | Cao | B62D 1/183 |
| 2021/0094417 | A1* | 4/2021 | Cobo | E02F 9/2083 |
| 2021/0331733 | A1* | 10/2021 | Ries | B62D 1/10 |
| 2021/0403076 | A1* | 12/2021 | Edamoto | B62D 1/187 |

FOREIGN PATENT DOCUMENTS

| | | |
|---|---|---|
| DE | 102016225297 A1 | 6/2018 |
| DE | 102017223111 A1 | 6/2019 |
| DE | 102018111327 A1 | 11/2019 |
| DE | 102019133221 A1 | 6/2020 |
| DE | 102020108454 A1 | 9/2021 |
| WO | 2018060443 A1 | 4/2018 |

* cited by examiner

DRIVING STATE-DEPENDENT RELEASE OF THE TILT FUNCTION OF A STEERING ELEMENT OF A VEHICLE

CROSS-REFERENCE TO RELATED APPLICATION

This application claims foreign priority benefits under 35 U.S.C. § 119(a)-(d) to German Application No. 102020214941.0 filed Nov. 27, 2020, which is hereby incorporated by reference in its entirety.

FIELD OF THE DISCLOSURE

The present disclosure generally relates to a method for releasing a tilt mechanism of a steering element in a vehicle, a steering arrangement with a steering element of a vehicle and a vehicle having the steering arrangement.

BACKGROUND OF THE DISCLOSURE

Vehicle steering systems having a tilt mechanism with the steering wheel are generally known. To create freedom of movement for the driver in situations where the driver does not need the steering wheel for driving, the steering wheel can be tilted away in its entirety. This is an advantage, for example, in the autonomous driving mode of the vehicle or when the vehicle is at a standstill. It is also possible to convert the tilted steering wheel into a table in just a few simple steps, for example. In addition to the tilt function, the steering wheels can be adjusted to the needs of the driver such as the height and the distance from the steering wheel to the driver, wherein the full functionality of the steering wheel is maintained. With this type of adjustment, the steering wheel typically remains in the steering position and the vehicle can be steered.

With some steering systems, only the rim can be tilted. For this purpose, a pin that locks the rim typically may be located in the hub and arranged coaxially to the tilt axis. Due to a special outer contour and the matching recess in the rim, the pin can block the rim movement and can release it by pulling it out. It may be desirable to improve the operation of the tilt function of a steering wheel.

SUMMARY OF THE DISCLOSURE

According to a first aspect of the present disclosure, a method for releasing a tilt mechanism for a steering element of a vehicle is provided. The method includes the steps of providing the steering element mounted pivotably around a tilt axis between a steering position and at least one non-steering position, fixing the steering element in the steering position and at least one non-steering position with at least one releasable locking arrangement, adopting at least one locking state with the locking arrangement in which a release of the at least one releasable locking arrangement is prevented, and adopting at least one release state with the at least one releasable locking arrangement in which the release of the locking arrangement is enabled.

According to a second aspect of the present disclosure, a steering assembly for a vehicle is provided. The steering assembly includes a holder, a steering element mounted pivotably to the holder, a tilt mechanism positioning the steering element around a tilt axis between a steering position and at least one non-steering position, and at least one releasable locking arrangement for fixing the steering element in the steering position and at least one non-steering position, wherein the locking arrangement is configured to adopt at least one locking state in which a release of the locking arrangement is prevented and to adopt at least one release state in which the release of the locking arrangement is enabled.

According to a third aspect of the present disclosure, a vehicle is provided that includes a steering assembly. The steering assembly includes a holder, a steering element mounted pivotably to the holder, a tilt mechanism positioning the steering element around a tilt axis between a steering position and at least one non-steering position, and at least one releasable locking arrangement for fixing the steering element in the steering position and at least one non-steering position, wherein the at least one releasable locking arrangement is configured to adopt at least one locking state in which a release of the at least one releasable locking arrangement is prevented and to adopt at least one release state in which the release of the at least one releasable locking arrangement is enabled.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1A:
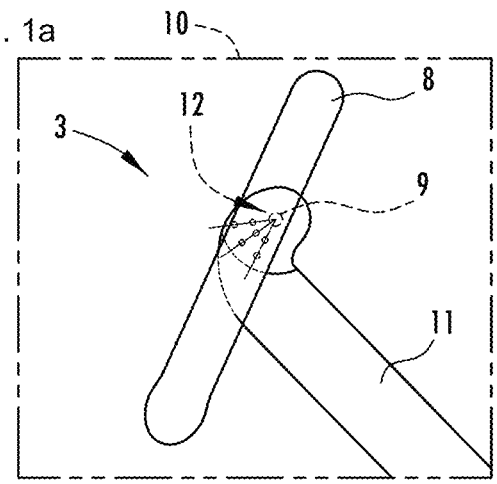
FIG. 1a is a schematic representation of an exemplary embodiment of a steering element with a tilt mechanism on a vehicle in a steering position.
Figure 1B:
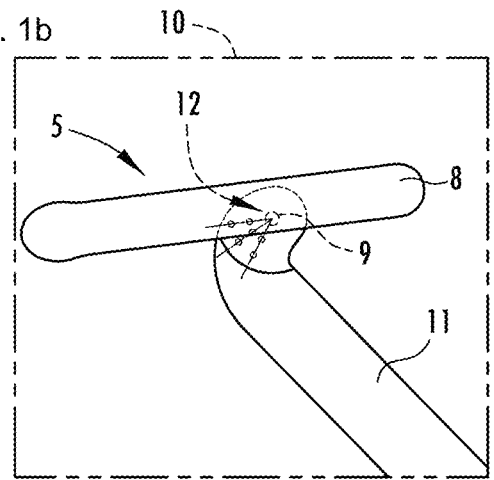
FIG. 1b is a schematic representation of an exemplary embodiment of the steering element with the tilt mechanism in a non-steering position.

For purposes of description herein, the terms "upper," "lower," "right," "left," "rear," "front," "vertical," "horizontal," and derivatives thereof shall relate to the concepts as oriented in FIGS. 1a and 1b. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a steering assembly and a method for releasing a tilt mechanism for a steering element of a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In the different figures, identical parts are always provided with the same reference signs, for which reason these parts are generally also described only once.

FIGS. 1a and 1b show a steering element 8 of a vehicle 10 in the form of a circular steering wheel. The vehicle comprises a tilt mechanism 12 for the steering element 8. The tilt mechanism 12 includes a releasable locking arrangement 9, which serves to fix the steering element 8 in different steering positions 3 shown in FIG. 1a and non-steering positions 5 shown in FIG. 1b. The different steering positions 3 and non-steering positions 5 differ in this example by the angle between the steering element 8 and its holder 11, which may be a steering column, for example. The non-steering position 5 is represented essentially horizontal here, so that a driver of the vehicle can use the plane spanned by the steering element 8 as a table or table support.

Figure 2:
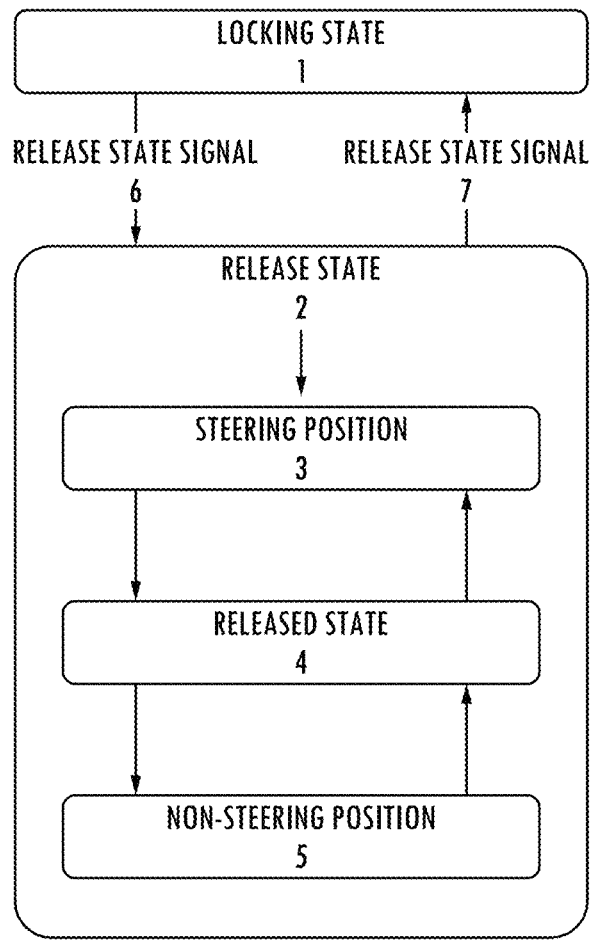
FIG. 2 is a logical flowchart illustrating one embodiment of a method for the situation-dependent release of the tilt function of the steering element.

FIG. 2 shows a representation of a logical flowchart of one embodiment of the method for the situation-dependent release of the tilt function of the steering element 8. Specifically, the locking arrangement can adopt a locking state 1 or a release state 2. Changing between the locking state 1 and the release state 2 is caused by the detection of a release state signal 6, 7, wherein it can be a release state signal 6 for signaling the release state 2 or a release state signal 7 for signaling the locking state 1. In order to generate the respective release state signal 6, 7, data regarding the driving state are evaluated, such as autonomous driving mode, parking state, etc.

In these two states, namely, the locking state 1 and release state 2, different functions are activated or deactivated. In the locking state 1, the tilt mechanism 12 is blocked, so that swiveling of the steering element 8 to a non-steering position 5 is prevented. This can be done by locking the locking arrangement 9. In the release state 2, on the other hand, it is possible to operate the tilt function, so the locking arrangement 9 can be released. By releasing the locking arrangement 9, the steering element 8 enters the released state 4, in which the steering element 8 can be swiveled around its tilt axis. In this state, the steering element 8 can be moved to a different position, in which the locking arrangement 9 then fixes the steering element 8 again. Once the steering element 8 is fixed, it is either in a steering position 3 or a non-steering position 5. Depending on the range of functions of the steering element 8, it may be useful to deactivate certain functions in the release state 4 or in a non-steering position 5, such as the horn, turn signals or multimedia buttons, in order to prevent accidental triggering of the respective functions.

According to the disclosure, the tilt function is locked in driving situations in which an adjustment of the steering element should not be possible. This primarily concerns the conditions in which the vehicle must be steered by the driver. If such a condition is exited, the tilt function can be released again. The disclosed method and steering arrangement is particularly suitable for autonomous vehicles but can also be used in non-autonomous vehicles.

It should be noted that the features listed individually in the claims can be combined with each other in any technically meaningful manner and may reveal further embodiments. This also applies across category boundaries, for example between the method and the steering arrangement. The description characterizes and specifies the method and steering arrangement in particular additionally in connection with the figures.

According to the disclosure, a method for releasing a tilt mechanism for a steering element of a vehicle is provided, wherein the steering element is swiveled around a tilt axis between a steering position and at least one non-steering position, wherein the steering element has at least one releasable locking arrangement, which fixes the steering element in the steering position and at least one non-steering position, wherein the locking arrangement can adopt at least one locking state in which the release of the locking arrangement is prevented and can adopt at least one release state in which the release of the locking arrangement is enabled.

The release of the tilt mechanism refers to the process that makes it possible to release the locking arrangement and then to swivel the steering element about the tilt axis predetermined by the tilt mechanism and to fundamentally change its position. The locking arrangement has the task, as long as it has not been released, to prevent the steering element from swiveling around the tilt axis. The steering element can be any device of a vehicle that gives the vehicle a direction. In particular, this can be, for example, a steering wheel or a joystick, for example. One of the positions that the steering element can occupy is the steering position. This is the position in which a driver is enabled to steer the vehicle. In most cases, there is not only one position in which the vehicle can be steered. Thus, several steering positions can also be occupied by the steering element. A non-steering position can be a position of the steering element in which the vehicle cannot be steered. This may be due to the functioning of the steering element or the difficult spatial accessibility of the steering element by the driver. For example, a steering element in a non-steering position may be folded in a way that leaves the driver more room for other purposes. It may be that the vehicle is still steerable even with a steering element in a non-steering position. Difficult steerability by the driver is sufficient to define a non-steering position. It is also conceivable that the steering wheel can no longer be gripped by the driver. For this purpose, the steering element may be concealed behind a cover or, depending on the tilt mechanism, may be mechanically separated from the vehicle. The locking state of the locking arrangement is a state in which it is not possible to swivel the steering element around the tilt axis into a non-steering position. In this situation, the release of the locking arrangement is prevented. In the release state, it is possible to release the locking arrangement and it is possible to swivel the steering element around the tilt axis. In other words, swiveling the steering element presupposes two things: first, the existence of a release state of the locking arrangement and, secondly, the release of the locking arrangement made possible by the presence of the release state.

The advantageous embodiments of the method proposed with the disclosure are described in more detail below. According to one embodiment of the proposed method, it may be provided that the locking arrangement releasably fixes the steering element with a locking element. In particular, it may be that the locking arrangement with another locking element prevents the release of the locking arrangement. To prevent this, the further locking element may be engaged with the locking element. The fixing of the steering element in the individual steering and non-steering positions can be carried out by locking elements, which lose their locking effect when released and allow the steering element to swivel around the tilt axis. The locking element could include, for example, pins, which engage in associated recesses for fixing and thus represent a reversible form-fitting connection between the steering element and a fastening point of the steering element. To release, these pins would be pulled out of the recesses and swiveling to another position could be carried out. The release of this locking element can be prevented by the further locking element, so that release of the locking arrangement is not possible. This can be viewed, for example, as a mechanical arrangement, or as a corresponding logical interconnection of, for example, mechanical or electronic elements. A software-based solution, for example with a logic circuit, is also conceivable.

According to a further embodiment of the proposed method, it may be provided that in order to prevent the release of the locking arrangement, a force action chain for swiveling the steering element is separated. If the locking arrangement and the steering element are released by force on a force action chain, this force action chain can be interrupted to prevent release.

However, according to other embodiments, the interruptible force action chain does not have to be a force action chain for swiveling the steering element, but it can also be a force action chain for releasing the locking arrangement in the narrower sense. According to a further embodiment of the proposed method, a force action chain for releasing the locking arrangement is separated to prevent the release of the locking arrangement. In particular, a force action chain for releasing the locking element can be separated.

By interrupting the force action chain, the force for releasing the locking arrangement cannot be forwarded to the corresponding device of the locking arrangement for releasing, so that releasing the locking arrangement is prevented in this way. An example of such a force action chain is a Bowden cable, which transmits a force to release the locking arrangement to locking pins by use of a push button and whose connection to the locking pins is separated mechanically. Thus, the locking pins cannot be changed in their position and continue to lock the tilting movement of the steering element. Other locking elements, which can successfully prevent the locking arrangement from releasing, can also be integrated into the force action chain. For example, in the force action chain, it may make sense that the other locking elements must first be released before the locking elements for fixing the steering element can be released.

However, this interruptible chain does not have to be purely mechanical, according to some embodiments. For example, when using an electric actuator, the force action chain can be affected by disconnecting an electrical connection of the actuator so that it maintains the fixing of the steering element. One embodiment of the proposed method is preferably characterized in that a signal line for an electrical signal for releasing the locking arrangement is disconnected to prevent the release of the locking arrangement.

In principle, the locking arrangement can also be mechanically brought into at least one locking state or at least one release state. According to a further embodiment of the proposed method, it may be provided that the locking state is adopted based on a release state signal received in particular from the locking arrangement and that the release state is adopted based on the release state signal. The release state signal can be generated by any device in the vehicle and contains information as to whether the steering element can be swiveled or not. In other words, the release state signal has the information about whether to adopt the locking state or the release state.

However, the release state signal can also be derived from other signals or information of the vehicle. For example, the information that the vehicle is in the autonomous driving mode can accordingly be understood by the locking arrangement to mean that a release state prevails, and the locking arrangement is enabled to release. Usually, in a modern vehicle, many signals are generated, such as the state of the handbrake, the speed, the selected gear, positioning signals such as GPS, wheel revolution rates, G-forces, occupied passenger seats, the state of the seatbelts and many more, which can be used to assess the release or locking state. This solution also does not necessarily require further components to lock the locking arrangement. In this embodiment, the locking arrangement can receive the release state signal or derive it itself from the available signals of the vehicle and can be set up in such a way that it only releases when a release state prevails. Releasing is not possible if a locking state prevails.

According to a further embodiment of the proposed method, it may be provided that a control unit of the locking arrangement manages the at least one locking state and the at least one release state of the locking arrangement. The control unit may receive the release state signal. Depending on the complexity of the locking arrangement, this can already include a control unit for its control. In this embodiment, this control unit can be accessed to prevent the locking arrangement from being released in the event of a locking state and to enable it in a release state. This can preferably be done by an electrical intervention of the control unit but can also be done by the control of additional mechanical locking elements by the control unit.

According to a further embodiment of the proposed method, it may be provided that the control unit receives the release state signal from a vehicle system of the vehicle. The release signal, which contains the information as to whether the vehicle is in a release state or a locking state, may be generated by the vehicle, so that the locking arrangement does not have to manage its own decision logic. This release signal can be made accessible to the locking arrangement in various ways, for example via its own cabling, wirelessly or via a ring line, as are common in CAN bus systems.

According to a further embodiment of the proposed method, it may be provided that the vehicle system is a CAN bus system. A CAN bus system (Controller Area Network data processing) is a network for data processing, which serves to allow different devices to communicate over the same physical cables without the need for individual physical cable connections for each connection. The use of a CAN bus vehicle system has the advantage that the required signals can be easily fed into the existing cable connections and tapped. It is possible to feed in additional signals or to use existing signals. Usually, the states of almost all devices in a modern vehicle are shared via such a CAN bus system, so that all these signals can be accessed and used to determine the release state or locking state.

The release signal can also come from vehicle systems other than the CAN bus system. For example, the control unit can also read the release signal from a LIN bus system and/or a hardwired connection and/or an Ethernet connection.

A vehicle often already has communication networks which can also process the corresponding data of the tilting steering wheel. Ethernet communication is a typical and very versatile network connection. It can be used to distribute large amounts of data quickly. A widely used communication network in motor vehicles is, for example, the CAN bus system (Controller Area Network system). This system enables the communication of multiple control units via shared cabling. A slightly simpler communication network is the LIN bus system (Local Interconnect Network system). This is often used when the high versatility and bandwidth of a CAN bus system are not required. For example, sensors and actuators are often networked via a LIN bus. If the complexity requirements are even lower, direct cable connections can also be laid, which can only be used for one function. These direct cable connections are called hardwired connections.

According to a further embodiment of the proposed method, it may be provided that the locking arrangement adopts a release state when the vehicle is in the autonomous driving mode. The vehicle system may send a release state signal to adopt the release state when the vehicle is in the autonomous driving mode. In the autonomous driving mode, it may not be necessary for a person to intervene, e.g., not even the actual driver of the vehicle. Therefore, it makes sense that a release state prevails in such a state. This allows the steering element which is not required to be swiveled to give the driver more space. It is also conceivable that the steering element will be used for something else in a release state, for example as a table or a support for a table.

According to a further embodiment of the proposed method, it may be provided that an on-board computer of the vehicle sends the release state signal, preferably in the autonomous driving mode. If the on-board computer, which may also control the autonomous driving mode, shares the release state signal, for example, the information about an active autonomous driving mode, no additional decision logic on the part of the locking arrangement may be required. However, there may well be reasons such as certain vehicle aspects, which is why an additional decision logic on the part of the locking arrangement can still be useful.

According to a further embodiment of the proposed method, it may be provided that the locking arrangement adopts a release state when the vehicle is in a parked state. Another situation in which the steering element may not be needed is when the vehicle is parked and not operating. Here, too, the space of the steering element can be used for other purposes, or the steering element can be used as a table, for example.

According to a further embodiment of the proposed method, it may be provided that the parked state is determined by an activated parking brake of the vehicle and/or a gear selector lever of the vehicle in the "N" Neutral position or the "P" parking position for an automatic transmission and/or idling for manual transmissions and/or a zero speed of the vehicle and/or switched off engines for propulsion of the vehicle and/or in a switched on engine mode protected against unintentional movement of the vehicle. Features such as the position of the gear selector lever or the speed of the vehicle come into question. The speed, in turn, can be determined by a GPS signal, wheel revolution rates or gear revolution rate. A switched off combustion engine or a deactivated electric motor can also be an indicator. However, it is also conceivable that a parked state exists despite the engine being switched on, as it may be necessary, depending on the technology used in the vehicle, for the engine to be running in order to be able to use the air conditioning of the passenger compartment, for example.

According to a further embodiment of the proposed method, it may be provided that a secured engine mode prevents a change in gear selection and/or prevents the release of the parking brake and/or prevents a throttle response of the engines. A secured engine mode can be advantageous if the vehicle is not suitable for driving by a driver due to its current settings, such as the steering wheel in a non-steering position and the vehicle in a parking position. This engine mode can then prevent an unwanted start-up of the engines, for example.

According to a further embodiment of the proposed method, it may be provided that the steering element is automatically brought into the steering position as soon as the locking arrangement adopts a locking state. In the event that the steering element is in a non-steering position and the vehicle changes from a release state to a locking state, the steering element can be returned to the steering position to allow the driver to steer the vehicle. Thus, it can be useful if the steering element automatically changes to a steering position. This automatic change can be done by actuators, or, for example, by a preload of the tilt mechanism by springs or similar embodiments. A lock for changing from a release state to a locking state of the vehicle while the steering element is in a non-steering position also achieves the object and can therefore also be useful.

According to a further embodiment of the proposed method, it may be provided that a warning signal is issued when the steering element is in a non-steering position and the locking arrangement is in a locking state. This warning signal is intended to convey to the driver of the vehicle that the driver should cause the steering element to be brought into the steering position. The warning signal can be output by an additional device in visual, acoustic or haptic form or combinations thereof. It is also conceivable that the warning signal will be issued by devices already present in the vehicle. This could be done, for example, by existing warning lights, displays or the multimedia equipment of the vehicle.

According to a further embodiment of the proposed method, it may be provided that the release state signal is determined based on at least two parameters. In order to be able to determine a release state or locking state as reliably as possible, it can be advantageous to evaluate several available signals for the determination of the release states or locking states. The release state signal may be determined redundantly. In this context, redundantly means that two parallel and independent checks of different signals are carried out, both of which should come to the same result in order to be able to make a reliable decision about release state or locking state. The system may be designed in such a way that, in case of doubt, the locking state is selected.

The proposed steering arrangement includes a steering element of a vehicle, wherein the steering element is mounted pivotably around a tilt axis between a steering position and at least one non-steering position, wherein the steering wheel has at least one releasable locking arrangement for fixing the steering element in the steering position and at least one non-steering position. The locking arrangement is set up to adopt at least one locking state in which the release of the locking arrangement is prevented and to adopt at least one release state in which the release of the locking arrangement is enabled.

A vehicle as proposed is equipped with the steering arrangement in accordance with the disclosure.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for releasing a tilt mechanism for a steering element of a vehicle, the method comprising:
    providing the steering element directly, pivotably mounted around a tilt axis of a holder between a steering position and a non-steering position;
    fixing the steering element in one of the steering position and the non-steering position with at least one releasable locking arrangement, the at least one releasable locking arrangement including:
        a locking element, the locking element having a first mechanical element including at least two pins of a plurality of pins selectively disposed within at least two recesses of a plurality of recesses defined by the steering element, wherein the at least two pins are coplanar with a profile of the steering element; and
        a further locking element engaged with the locking element, the further locking element including:
            a second mechanical element including a force action chain selectively interrupted; and
            an electronic element in communication with the force action chain;
    adopting a locking state of at least two states with the at least one releasable locking arrangement in which a release of the at least one releasable locking arrangement is prevented; and
    adopting a release state of the at least two states with the at least one releasable locking arrangement in which the release of the at least one releasable locking arrangement is enabled.

2. The method according to claim 1, wherein to prevent the release of the at least one releasable locking arrangement, the second mechanical element includes the force action chain for releasing the plurality of pins of the first mechanical element of the locking element of the at least one releasable locking arrangement from the steering element.

3. The method according to claim 1, wherein the locking state is adopted based on a release state signal received from the at least one releasable locking arrangement so that the release state is adopted based on the release state signal.

4. The method according to claim 3, wherein an on-board computer of the vehicle sends the release state signal in an autonomous driving mode.

5. The method according to claim 1 further comprising managing the at least one locking state and the at least one release state of the at least one releasable locking arrangement with a control unit of the at least one releasable locking arrangement in that the control unit receives a release state signal sent from the electronic element of the further locking element.

6. The method according to claim 5, wherein the control unit receives the release state signal from a vehicle system of the vehicle.

7. The method according to claim 6, wherein the vehicle system is a CAN bus system or an Ethernet connection or a LIN bus system or a hardwired connection.

8. The method according to claim 1, wherein the locking arrangement adopts a release state when the vehicle is in the autonomous driving mode, in that the vehicle system sends a release state signal to adopt the release state when the vehicle is in the autonomous driving mode.

9. The method according to claim 1, wherein the locking arrangement adopts a release state when the vehicle is in a parked state.

10. The method according to claim 9, wherein the parked state is determined by an activated parking brake of the vehicle and/or a gear selector lever of the vehicle in the "N" Neutral position or the "P" parking position for an automatic transmission and/or idling for manual transmissions and/or a zero speed of the vehicle and/or switched off engines for propulsion of the vehicle and/or in a switched on engine mode protected against unintentional vehicle movement.

11. The method according to claim 10, wherein a secured engine mode prevents a change in gear selection and/or prevents the release of the parking brake and/or prevents a throttle response of the engines.

12. The method according to claim 1, wherein the steering element is automatically brought into the steering position as soon as the locking arrangement adopts a locking state.

13. The method according to claim 1, wherein a warning signal is output when the steering element is in a non-steering position and the locking arrangement is in a locking state.

14. The method according to claim 1, wherein a release state signal is determined based on at least two parameters chosen from a G-force signal, an occupancy detection signal, and a location signal, wherein the locking state prevails based fewer than two parameters of the at least two parameters being met required to enable the release state of the at least one releasable locking arrangement.

15. A steering assembly for a vehicle, the steering assembly comprising:
a holder hang a it mechanism;
a steering element mounted directly, pivotably to the tilt mechanism of the holder;
the tilt mechanism positioning the steering element around a tilt axis between a steering position and at least one non-steering position; and
at least one releasable locking arrangement for fixing the steering element in one of the steering position and at least one non-steering position, wherein the locking arrangement includes:
a locking element having a plurality of pins selectively extending into the steering element, wherein the plurality of pins are substantially coplanar with a profile of the steering element; and
a further locking element engaged with the locking element, the further locking element including a force action chain selectively engaged with the plurality of pins, wherein the force action chain is interrupted by an electrical signal to prevent engagement with the plurality of pins, wherein the at least one releasable locking arrangement is configured to adopt at least one locking state in which a release of the locking arrangement is prevented and to adopt at least one release state in which the release of the locking arrangement is enabled.

16. The steering assembly according to claim 15, wherein the at least one releasable locking arrangement fixes the steering element releasably with the locking element, and wherein the at least one releasable locking arrangement with the further locking element prevents the release of the at least one releasable locking arrangement in that the further locking element engages the locking element for the prevention.

17. The steering assembly according to claim 15, wherein the locking state is adopted based on a release state signal received from the locking arrangement in that the release state is adopted based on the release state signal.

18. The steering assembly according to claim 15 further comprising managing the at least one locking state and the at least one release state of the at least one releasable locking arrangement with a control unit of the at least one releasable locking arrangement in that the control unit receives release state signal.

19. A vehicle comprising:
a steering assembly comprising:
a holder;
a steering element mounted pivotably to the holder;
a tilt mechanism disposed within the holder, the tilt mechanism positioning the steering element around a tilt axis between a steering position and at least one non-steering position; and
at least one releasable locking arrangement for fixing the steering element in the steering position and at least one non-steering position, wherein the at least one releasable locking arrangement is configured to adopt at least one locking state in which a release of the at least one releasable locking arrangement is prevented and to adopt at least one release state in which the release of the at least one releasable locking arrangement is enabled, and wherein the at least one releasable locking arrangement includes:
a first locking element having a plurality of pins selectively extending into a respective plurality of recesses defined by steering element, wherein the plurality of recesses outnumber of the plurality of pins, wherein at least a first recess and second recess of the plurality of recesses are coplanar with the steering element in the steering position, and wherein at least a third recess and fourth recess of the plurality of recesses are substantially coplanar with the steering element in the at least one non-steering position; and
a second locking element selectively engaged with the first locking element, wherein the second locking element includes a force action chain selectively interrupted from the plurality of pins by an electronic element, and wherein the at least one releasable locking arrangement adopts the at least one locking state based on the force action chain being interrupted from the plurality of pins.

* * * * *

UNITED STATES PATENT AND TRADEMARK OFFICE
CERTIFICATE OF CORRECTION

| | |
|---|---|
| PATENT NO. | : 11,912,334 B2 |
| APPLICATION NO. | : 17/533203 |
| DATED | : February 27, 2024 |
| INVENTOR(S) | : Kuepper et al. |

It is certified that error appears in the above-identified patent and that said Letters Patent is hereby corrected as shown below:

In the Claims

Column 11:
Claim 15, Line 21;
"hang a it" should be --having a tilt--.

Column 12:
Claim 18, Line 12;
After "receives" insert --a--.

Column 12:
Claim 19, Line 35 (2nd occurrence);
Delete "of".

Signed and Sealed this
Twenty-third Day of April, 2024

Katherine Kelly Vidal
*Director of the United States Patent and Trademark Office*